US012362524B2

(12) United States Patent
Ito et al.

(10) Patent No.: US 12,362,524 B2
(45) Date of Patent: Jul. 15, 2025

(54) CONNECTION STRUCTURE OF SHIELDED TERMINAL AND SHIELDED ELECTRICAL WIRE

(71) Applicant: SUMITOMO WIRING SYSTEMS, LTD., Mie (JP)

(72) Inventors: Yusuke Ito, Mie (JP); Tomoaki Yasuda, Mie (JP); Shohei Mitsui, Mie (JP); Wataru Yamanaka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 365 days.

(21) Appl. No.: 17/989,407

(22) Filed: Nov. 17, 2022

(65) Prior Publication Data

US 2023/0163536 A1 May 25, 2023

(30) Foreign Application Priority Data

Nov. 24, 2021 (JP) ................................ 2021-190346

(51) Int. Cl.

| | |
|---|---|
| ***H01R 24/40*** | (2011.01) |
| ***H01R 4/18*** | (2006.01) |
| ***H01R 13/629*** | (2006.01) |
| ***H01R 13/6581*** | (2011.01) |
| ***H01R 13/6592*** | (2011.01) |
| ***H01R 13/6598*** | (2011.01) |

(52) U.S. Cl.

CPC ............... *H01R 24/40* (2013.01); *H01R 4/18* (2013.01); *H01R 13/629* (2013.01); *H01R 13/6581* (2013.01); *H01R 13/6592* (2013.01); *H01R 13/6598* (2013.01)

(58) Field of Classification Search

CPC ........ H01R 24/40; H01R 4/18; H01R 13/629; H01R 13/6581; H01R 13/6592; H01R 13/6598

USPC .......................................................... 439/578

See application file for complete search history.

(56) References Cited

U.S. PATENT DOCUMENTS 5,409,400 A * 4/1995 Davis ..................... H01R 24/60 439/906
6,384,335 B1 * 5/2002 Saito .................... H01R 9/0518 439/585

(Continued)

FOREIGN PATENT DOCUMENTS

DE 102007028867 A1 * 12/2007 ............. H01R 4/185
EP 1003249 A1 * 5/2000 ............. H01R 4/184

(Continued)

*Primary Examiner* — Peter G Leigh
(74) *Attorney, Agent, or Firm* — Venjuris, P.C.

(57) ABSTRACT

A connection structure of a shielded terminal 10 and a shielded electrical wire 60 includes a shielded electrical wire 60 including a shield layer 63; and a shielded terminal 10 including an outer conductor 20 connected to the shield layer 63, wherein the outer conductor 20 is formed by assembling a first shell 21 including an electrical wire connection portion 30, 31, 32 that comes into contact with an outer circumference of the shield layer 63, and a second shell 22 including a compression bonding portion 44 that is crimped to an outer circumference of the electrical wire connection portion 30, 31, 32, and a catch portion 36 that catches on an outer circumferential surface of the shield layer 63 is formed in the electrical wire connection portion 30, 31, 32.

9 Claims, 7 Drawing Sheets

(56) References Cited

U.S. PATENT DOCUMENTS

| | | | | |
|---|---|---|---|---|
| 7,291,043 | B2 * | 11/2007 | Morikawa | H01R 9/05 439/585 |
| 7,422,480 | B1 * | 9/2008 | Musick | H01R 9/0518 439/879 |
| 7,465,194 | B1 * | 12/2008 | Ho | H01R 13/26 439/607.01 |
| 8,011,954 | B2 * | 9/2011 | Nagafuchi | H01R 9/0518 439/585 |
| 8,057,258 | B2 * | 11/2011 | Kawaguchi | H01R 13/6593 439/585 |
| 10,594,056 | B2 * | 3/2020 | Kanemura | H01R 13/6592 |
| 10,741,976 | B1 * | 8/2020 | Maesoba | H01R 13/6582 |
| 10,833,456 | B2 * | 11/2020 | Maesoba | H01R 13/6582 |
| 10,910,733 | B2 * | 2/2021 | Miyamoto | H01R 4/185 |
| 2013/0224996 | A1 * | 8/2013 | Miyawaki | H01R 9/05 439/585 |
| 2018/0198266 | A1 * | 7/2018 | Inoue | H01R 13/115 |
| 2019/0199014 | A1 * | 6/2019 | Kanemura | H01R 13/113 |

FOREIGN PATENT DOCUMENTS

| | | | | | |
|---|---|---|---|---|---|
| JP | H09-120870 | A | | 5/1997 | |
| JP | 2002208461 | A | * | 7/2002 | |
| JP | 6939531 | B2 | * | 9/2021 | H01R 13/113 |
| WO | WO-2012137989 | A1 | * | 10/2012 | H01R 13/646 |
| WO | WO-2018142885 | A1 | * | 8/2018 | H01R 13/4364 |
| WO | WO-2018142886 | A1 | * | 8/2018 | H01R 13/502 |
| WO | WO-2021192939 | A1 | * | 9/2021 | H01R 13/6581 |

* cited by examiner

CONNECTION STRUCTURE OF SHIELDED TERMINAL AND SHIELDED ELECTRICAL WIRE

CROSS-REFERENCE TO RELATED APPLICATIONS

This application is based on and claims priority from Japanese Patent Application No. 2021-190346, filed on Nov. 24, 2021, with the Japan Patent Office, the disclosure of which is incorporated herein in its entirety by reference.

TECHNICAL FIELD

The present disclosure relates to a connection structure of a shielded terminal and a shielded electrical wire

BACKGROUND

A connector for a coaxial cable described in JP H9-120870 includes a coaxial cable including an outer conductor, a terminal for an outer conductor including an outer conductor receiving portion, and a cover member including an outer conductor support portion. The outer conductor of the coaxial cable is received inside the outer conductor receiving portion of the terminal for an outer conductor, and the outer conductor receiving portion is received inside the outer conductor support portion of the cover member. By performing compression bonding on the outer conductor support portion, the outer conductor, the terminal for an outer conductor, and the cover member are connected in a manner that allows electricity to flow.

SUMMARY

In the technique described above, the outer conductor, the terminal for an outer conductor, and the cover member are bonded via only friction resistance caused by the compression bonding strength of the outer conductor support portion. Accordingly, when the coaxial cable is pulled, the coaxial cable may be moved in the axis direction relative to the terminal for an outer conductor and the cover member.

The connection structure of a shielded terminal and a shielded electrical wire of the present disclosure has been made in light of the foregoing and is directed at improving the bonding performance from compression bonding.

A connection structure of a shielded terminal and a shielded electrical wire according to the present disclosure includes: a shielded electrical wire including a shield layer; and a shielded terminal including an outer conductor connected to the shield layer, wherein the outer conductor is formed by assembling a first shell including an electrical wire connection portion that comes into contact with an outer circumference of the shield layer, and a second shell including a compression bonding portion that is crimped to an outer circumference of the electrical wire connection portion, and wherein a catch portion that catches on an outer circumferential surface of the shield layer is formed in the electrical wire connection portion.

According to the present disclosure, the bonding performance from compression bonding can be improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
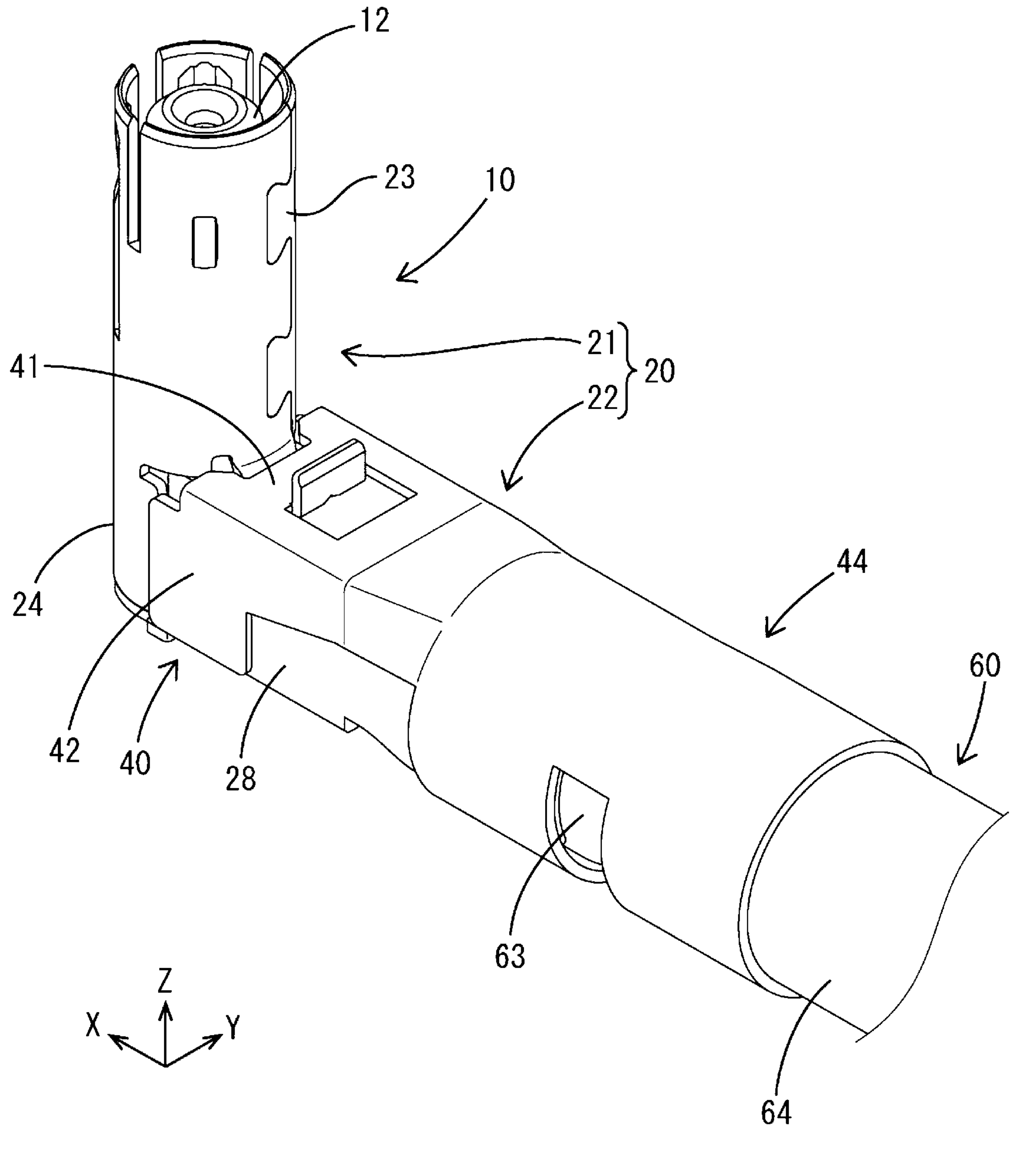
FIG. 1 is a perspective view of a shielded terminal and a shielded electrical wire forming a connection structure according to a first embodiment as seen from diagonally up and back.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Firstly, embodiments of the present disclosure will be listed and described.

(1) A connection structure of a shielded terminal and a shielded electrical wire according to the present disclosure includes: a shielded electrical wire including a shield layer; and a shielded terminal including an outer conductor connected to the shield layer, wherein the outer conductor is formed by assembling a first shell including an electrical wire connection portion that comes into contact with an outer circumference of the shield layer, and a second shell including a compression bonding portion that is crimped to an outer circumference of the electrical wire connection portion, and wherein a catch portion that catches on an outer circumferential surface of the shield layer is formed in the electrical wire connection portion. According to the configuration of the present disclosure, by the catch portion catching on the outer circumferential surface of the shield layer, relative movement between the shielded electrical wire and the outer conductor is prevented. This can improve the reliability of the bonding performance from compression bonding.

(2) Preferably, the catch portion is an opening edge of a through hole that extends through the electrical wire connection portion from an outer circumferential surface to an inner circumferential surface. According to this configuration, the outer circumferential portion of the shield layer enters into the through hole, and the shield layer catches on the catch portion of the opening edge of the through hole. Also, in the process of forming the catch portion, cut and raising and other similar bending processing is unnecessary. Thus, manufacturing costs can be reduced.

(3) Preferably, a plurality of the electrical wire connection portions are disposed at intervals in a circumferential direction. According to this configuration, each electrical wire connection portion is displaced in the radial direction independently of the other electrical wire connection portions and is pressed against the outer circumferential surface of the shield layer. Thus, the catch portion can deeply dig into the shield layer.

(4) Preferably, the compression bonding portion includes a crimping portion that extends in a circumferential direction from a substrate portion while supported on only one side, and an engagement projection that engages with an engagement hole of the electrical wire connection portion is formed on an extending end portion of the crimping portion. According to this configuration, relative movement between the first shell and the second shell can be prevented by the locking action of the engagement projection of the crimping portion and the engagement hole of the electrical wire connection portion.

(5) With the configuration of (4), preferably, the engagement projection digs into the shield layer. According to this configuration, relative movement between the compression bonding portion and the shield layer can be prevented.

(6) Preferably, the compression bonding portion includes a crimping portion that extends in a circumferential direction from a substrate portion while supported on only one side, the compression bonding portion is crimped at an outer circumferential edge portion of the crimping portion to give a maximum amount of deformation, and the catch portion is disposed in a region pressed by an outer circumferential edge portion of the crimping portion. According to this configuration, the catch portion can effectively dig into the shield layer.

DETAILED EMBODIMENTS OF PRESENT DISCLOSURE

First Embodiment

The present embodiment is an implementation of the present disclosure and is described below with reference to FIGS. 1 to 7. Note that the present invention is not limited to these examples and is defined by the scope of the claims, and all modifications that are equivalent to or within the scope of the claims are included. In the first embodiment, regarding the front and back directions, the forward direction of the X axis in FIGS. 1 to 4 is defined as the front direction. Regarding the left and right directions, the forward direction of the Y axis in FIGS. 1 and 3 to 6 is defined as the right direction. Regarding the up and down directions, the forward direction of the Z axis in FIGS. 1 to 6 is defined as the up direction.

Figure 2:
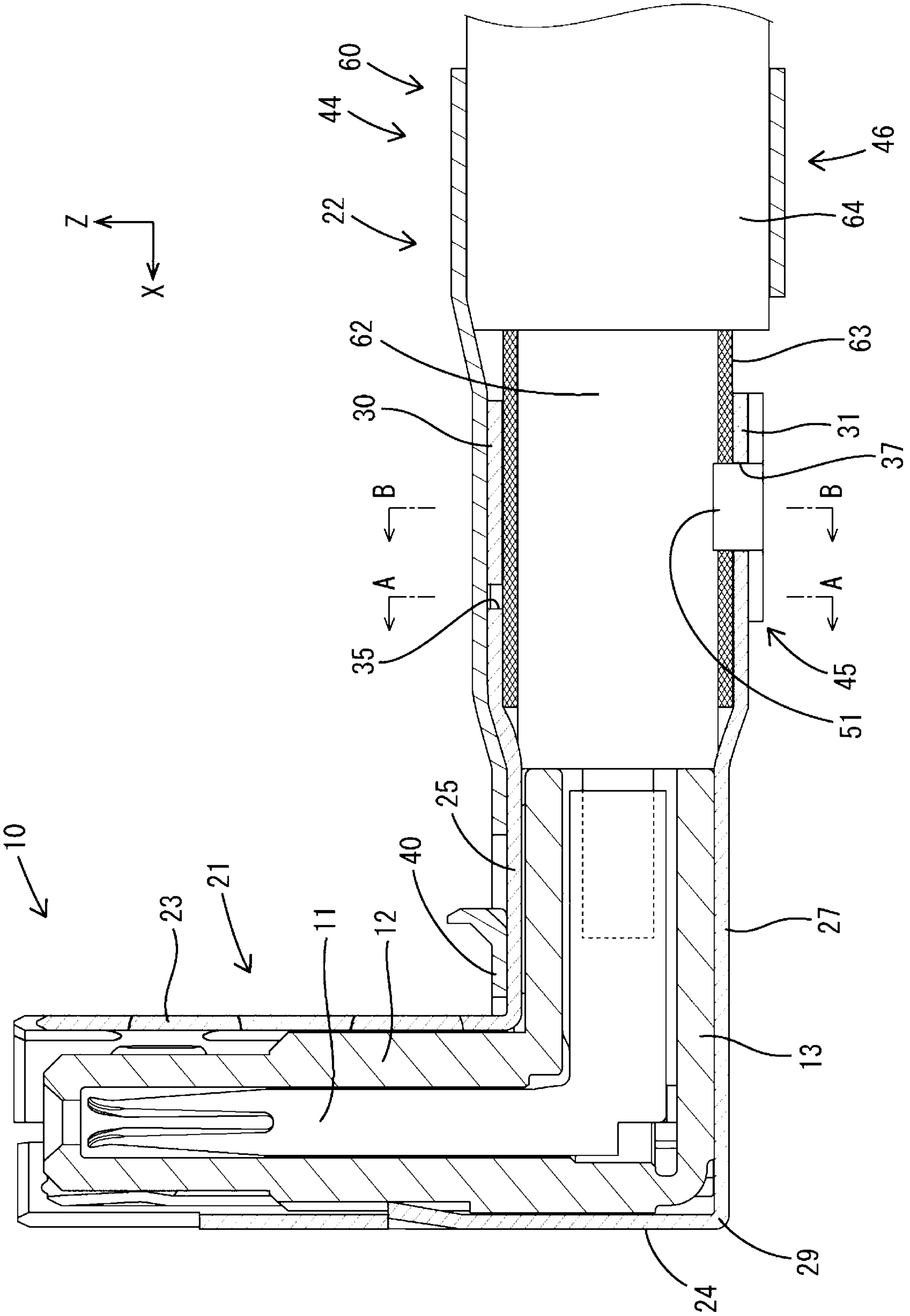
FIG. 2 is a side cross-sectional view of the shielded terminal and the shielded electrical wire.

A connection structure of the first embodiment includes a shielded terminal 10 and a shielded electrical wire 60. The shielded terminal 10 and the shielded electrical wire 60 are connected via compression bonding in a manner that allows electricity to flow and together form a shielded conductive path. As illustrated in FIGS. 1 and 2, in a side view of the shielded terminal 10 and the shielded electrical wire 60 as seen from the side, the shielded terminal 10 has a shape bent in an L-shape. As illustrated in FIG. 2, the shielded terminal 10 is formed by assembling together an inner conductor 11 bent in an L-shape, a dielectric 12 enclosing the inner conductor 11, and an outer conductor 20 enclosing the inner conductor 11 and the dielectric 12. The lower surface in the internal space of the dielectric 12 can be opened and closed via a cover portion 13. The inner conductor 11 is housed inside the dielectric 12 with the cover portion 13 in an opened state.

Figure 3:
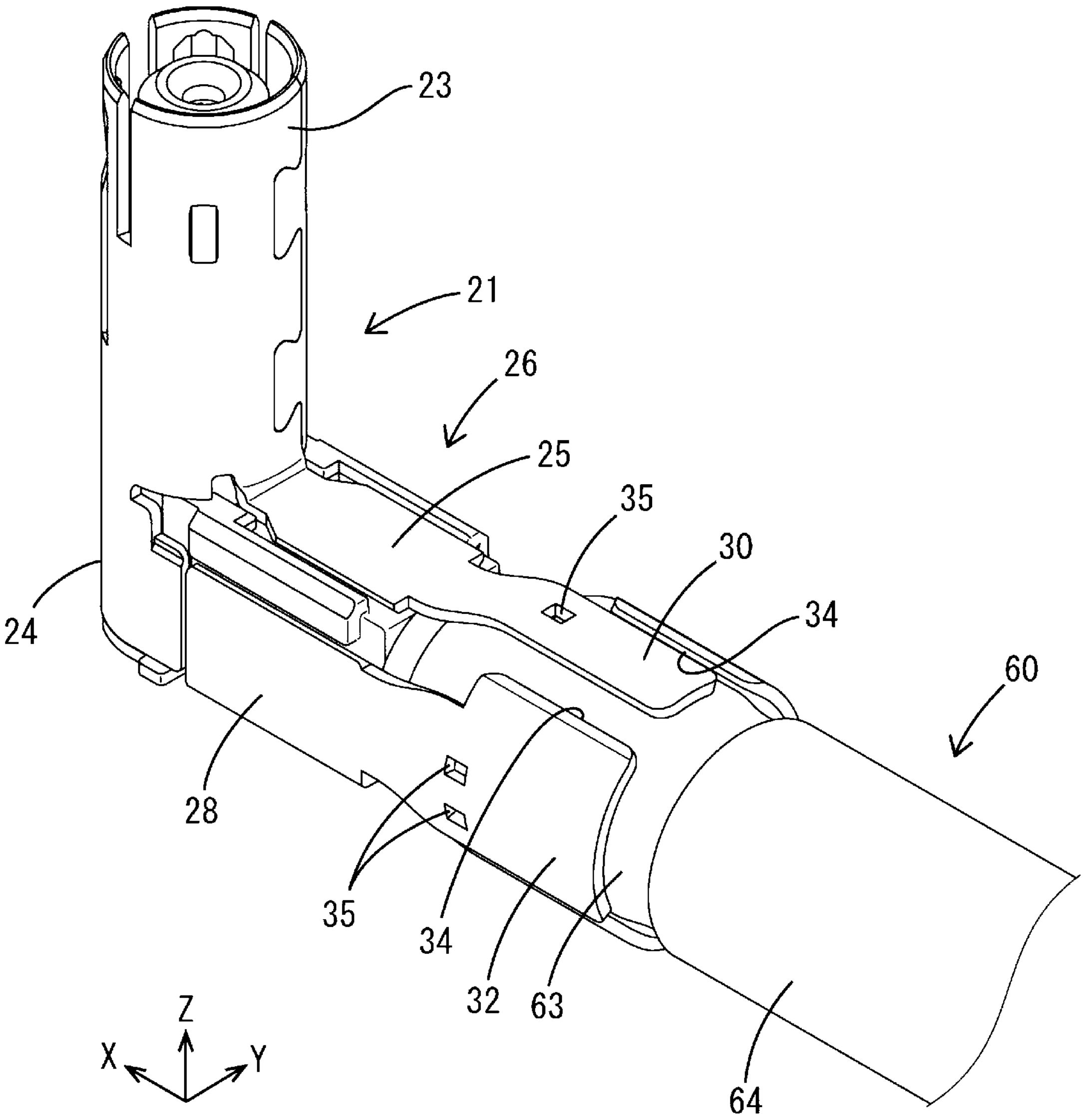
FIG. 3 is a perspective view of a state with a second shell removed as seen from diagonally up and back.
Figure 4:
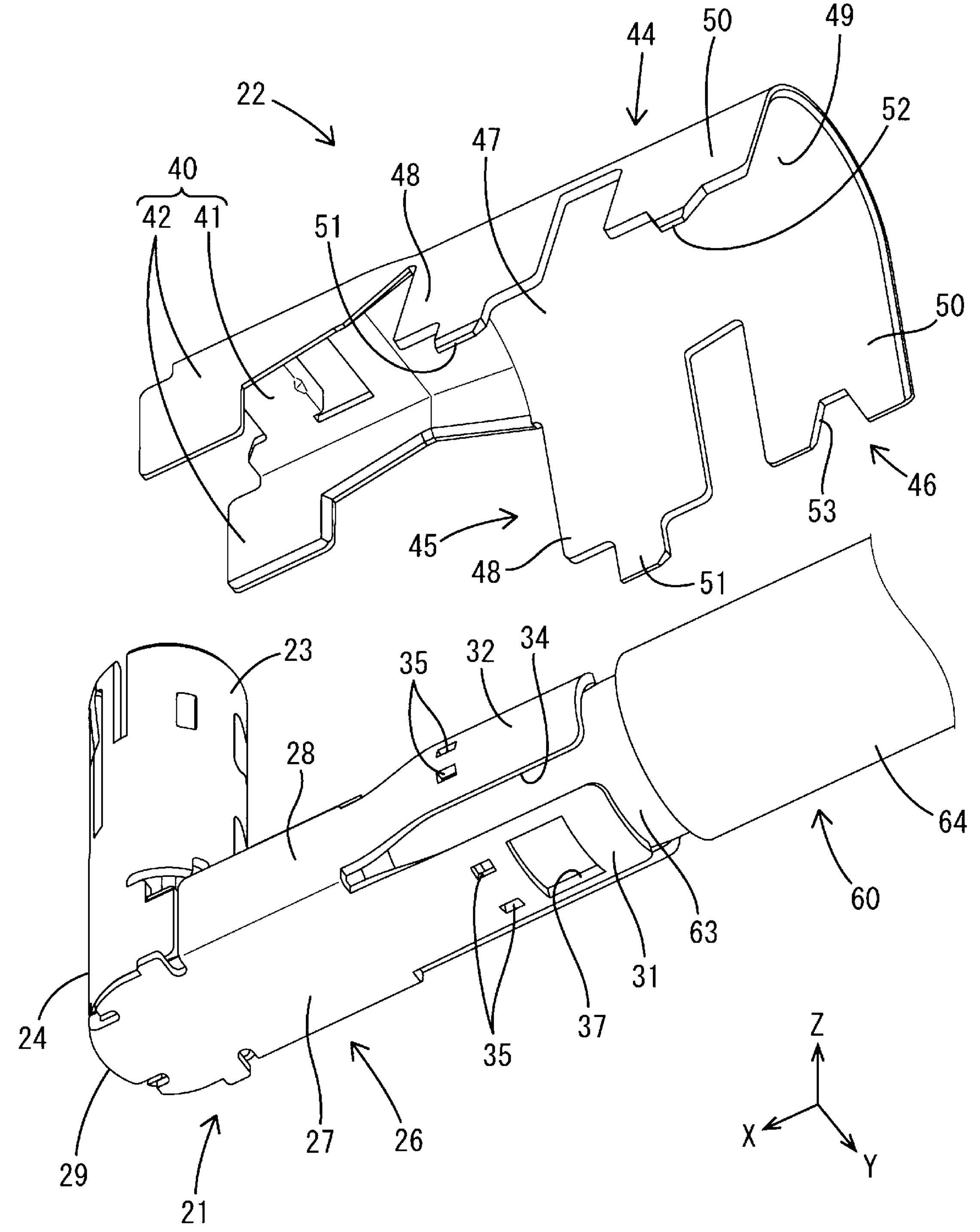
FIG. 4 is a perspective view of a state with a second shell removed as seen from diagonally down and back.

As illustrated in FIGS. 2 to 4, the outer conductor 20 is formed by assembling a first shell 21 including a metal plate member and a second shell 22 including a metal plate member separate from the first shell 21. In a state before the inner conductor 11 and the dielectric 12 are assembled with the outer conductor 20, the first shell 21 is formed in the shape illustrated in FIG. 7. The orientation in terms of the up-and-down direction and front-and-back direction of the shape of the first shell 21 will be described on the basis of state illustrated in FIGS. 2 to 4 in which the inner conductor 11 and the dielectric 12 have been assembled together.

The first shell 21 is a single component and includes a cylindrical portion 23 with its axis orientated in the up-and-down direction and an arc portion 24 that is contiguous with the lower end portion of the cylindrical portion 23. The arc portion 24 extends downward coaxially with the cylindrical portion 23 from a substantially semi-circular region on the front side at the lower end of the cylindrical portion 23. An extending portion 25 with a plate-like shape and orientated with its thickness direction corresponding to the up-and-down direction extends backward from a back end side region at the lower edge of the cylindrical portion 23.

The first shell 21 includes an angular enclosing portion 26. The angular enclosing portion 26 includes the extending portion 25 described above, the substrate portion 27, and a left and right pair of side plate portions 28. The substrate portion 27 extends backward from a bend portion 29 of the front end portion at the lower edge of the arc portion 24. The thickness direction of the substrate portion 27 corresponds to the up-and-down direction. The left and right side plate portions 28 are orientated with their thickness direction corresponding to the left-and-right direction and extend upward like walls from the left and right side edges of the substrate portion 27. The side plate portions 28 are arranged at the back of the back end edges of the arc portion 24 with a gap therebetween. The extending portion 25 is located above the substrate portion 27.

The first shell 21 includes an upper surface electrical wire connection portion 30, and a lower surface electrical wire connection portion 31, and a left and right pair of side surface electrical wire connection portions 32. These four electrical wire connection portions 30, 31, and 32 have a plate-like shape and extend, while supported at only one side, backward from the back end of the angular enclosing portion 26. The upper surface electrical wire connection portion 30 includes a flat plate, is orientated with its thickness direction corresponding to the up-and-down direction, and is contiguous with the back end of the extending portion 25. The lower surface electrical wire connection portion 31 includes a curved plate curved in an arc shape, is disposed below the upper surface electrical wire connection portion 30 orientated its thickness direction corresponding to the up-and-down direction, and is contiguous with the back end of the substrate portion 27. The pair of left and right side surface electrical wire connection portions 32 each include a curved plate curved in an arc shape, are orientated with their thickness direction corresponding to the left-and-right direction, and are contiguous with the back ends of the side plate portions 28.

These four electrical wire connection portions 30, 31, and 32 are arranged in the circumferential direction centered on the axis of the front-and-back direction with a slit 34 orientated in the front-and-back direction formed between each. The four electrical wire connection portions 30, 31, and 32 are disposed forming a tube-like shape. A shield layer 63 of the shielded electrical wire 60 described below is housed in the space enclosed by the four electrical wire connection portions 30, 31, and 32. The four electrical wire connection portions 30, 31, and 32 are disposed in a non-contact positional relationship, and thus can be individually displaced in the radial direction (in the direction toward and away from the outer circumferential surface of the shielded electrical wire 60) independently of the other electrical wire connection portions 30, 31, and 32.

A rectangle through hole 35 is formed in the front end portion of each one of the four electrical wire connection portions 30, 31, and 32. All of the through holes 35 formed in the four electrical wire connection portions 30, 31, and 32 are disposed at the same position in the front-and-back direction. The through holes 35 formed in the four electrical wire connection portions 30, 31, and 32 are disposed at intervals in the circumferential direction. One through hole 35 is formed in the upper surface electrical wire connection portion 30. A pair of the through holes 35 spaced apart in the left-and-right direction (circumferential direction) are formed in the lower surface electrical wire connection portion 31. A pair of the through holes 35 spaced apart in the up-and-down direction (circumferential direction) are formed in both the left and right side surface electrical wire connection portions 32.

The through holes 35 are each formed in a window-like shape via a pressing process and extend through from the outer surface to the inner surface of the electrical wire connection portions 30, 31, and 32. The inner surfaces of the electrical wire connection portions 30, 31, and 32 are surfaces that face the outer circumferential surface of the shielded electrical wire 60. The opening edges of the through holes 35 on the inner surfaces of the electrical wire connection portions 30, 31, and 32 are each formed in right angle edge-like shape via a pressing process and each correspond to a portion that functions as a catch portion 36 (see FIG. 5). All of the edges of the opening edges of the through holes 35 function as the catch portions 36.

An engagement hole 37 with a rectangular opening is formed in the lower surface electrical wire connection portion 31. The engagement hole 37 is formed in a window-like shape via a pressing process and extends through from the outer surface to the inner surface of the lower surface electrical wire connection portion 31. The engagement hole 37 is disposed further back than the through holes 35. The opening area of the engagement hole 37 is greater than the opening area of one through hole 35.

As illustrated in FIG. 4, the second shell 22 is a single component including a shielding portion 40 and a compression bonding portion 44. The shielding portion 40 includes an upper surface plate portion 41 orientated with its thickness direction corresponding to the up-and-down direction and a left and right pair of side surface plate portions 42 extending downward from the left and right side edges of the upper surface plate portion 41. The shielding portion 40 has the function of closing the gap in the angular enclosing portion 26 of the first shell 21.

The compression bonding portion 44 includes a wire barrel portion 45 and an insulation barrel portion 46. The wire barrel portion 45 includes a plate-like front side base portion 47 extending backward from the back end of the upper surface plate portion 41 and a left and right pair of front side crimping portions 48 extending downward from the left and right side edges of the plate-like front side base portion 47. The insulation barrel portion 46 includes a plate-like back side base portion 49 extending backward from the back end of the plate-like front side base portion 47 and a left and right pair of back side crimping portions 50 extending downward from the left and right side edges of the plate-like back side base portion 49. An engagement projection 51 is formed on the extending end edge of each one of the left and right front side crimping portions 48. A positioning projection portion 52 is formed on the extending end edge of the back side crimping portion 50 on the left side, and a positioning recess portion 53 is formed on the extending end edge of the back side crimping portion 50 on the right side.

Figure 5:
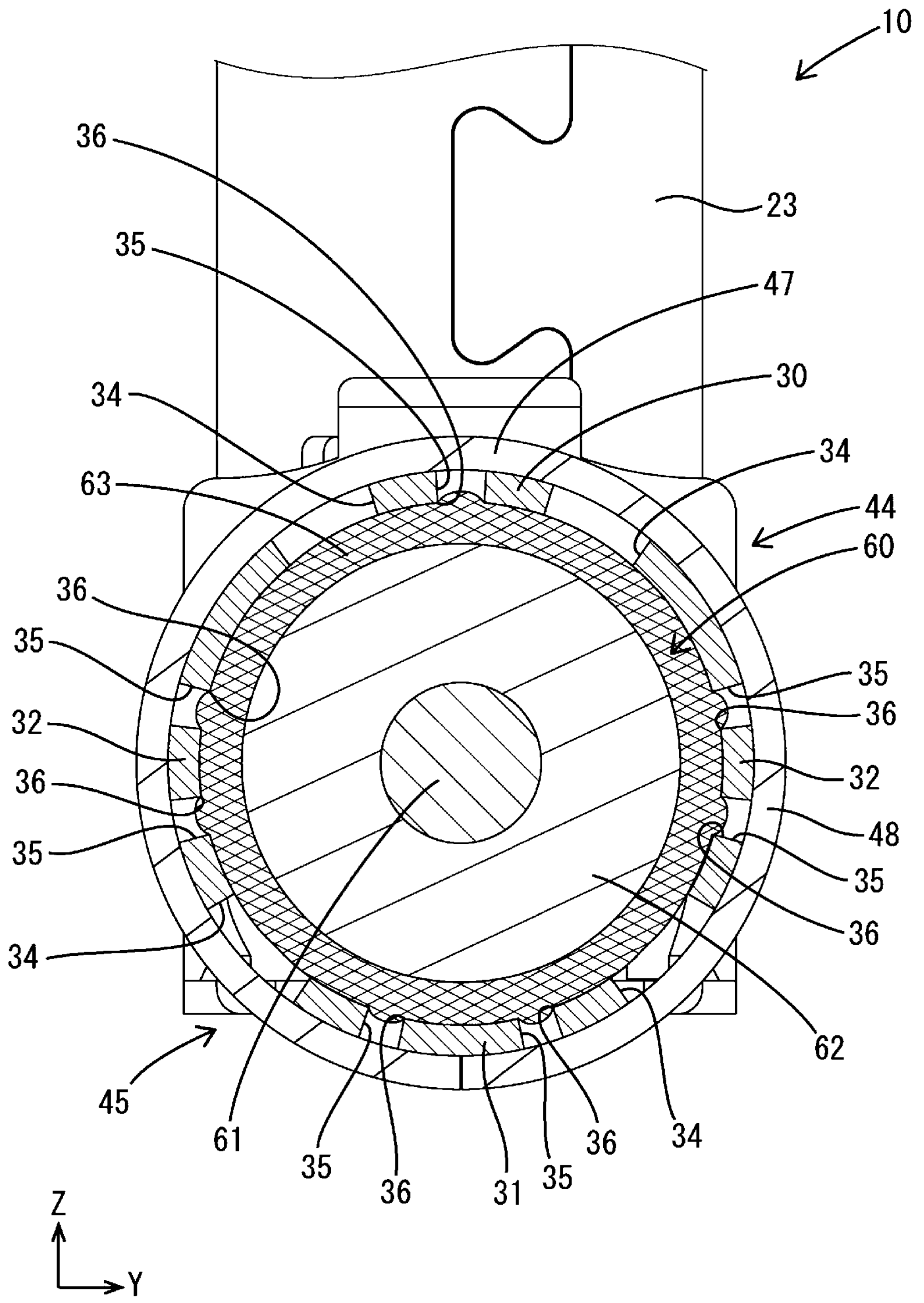
FIG. 5 is a cross-sectional view taken along line A-A of FIG. 2.
Figure 6:
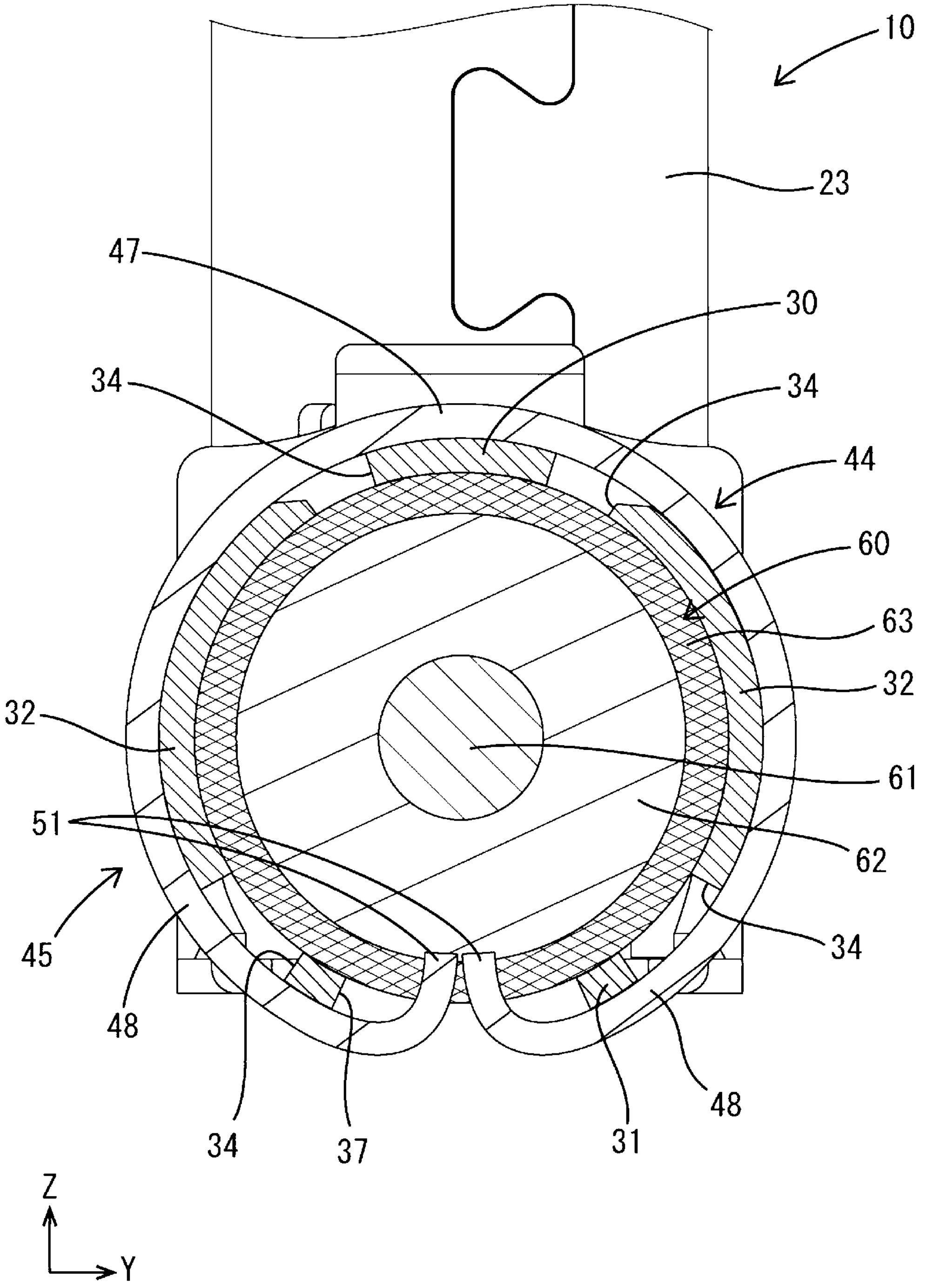
FIG. 6 is a cross-sectional view taken along line B-B of FIG. 2.
Figure 7:
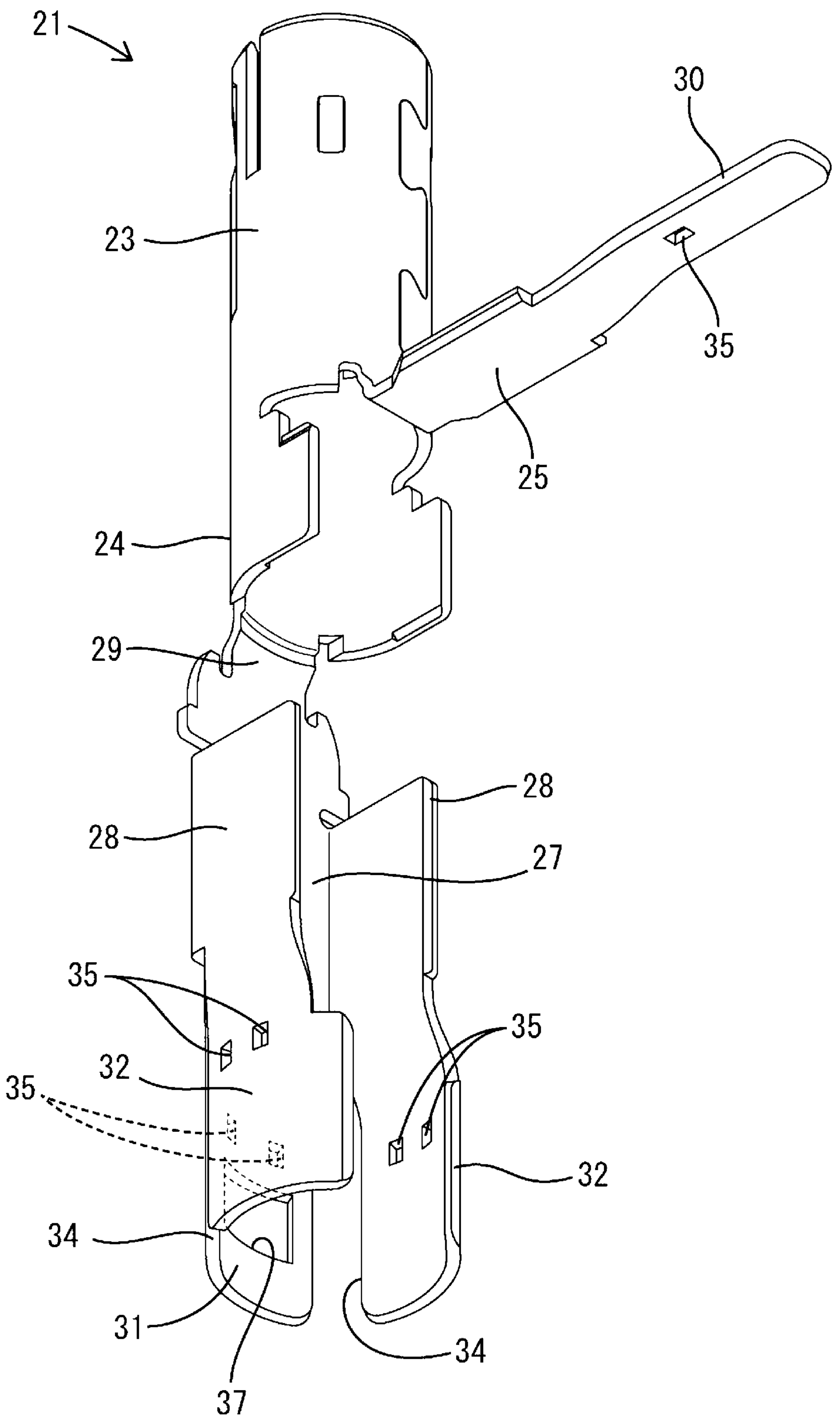
FIG. 7 is a perspective view of a state before a first shell is bent as seen from diagonally down and back.

As illustrated in FIGS. 5 and 6, the shielded electrical wire 60 includes a coaxial cable including a core wire 61, a cylindrical insulating cover 62 that encloses the core wire 61 in a concentric manner, the shield layer 63 that covers the outer circumferential surface of the insulating cover 62, and a cylindrical sheath 64 that encloses the shield layer 63. At the front end of the shielded electrical wire 60, the front end portion of the core wire 61 projects forward from the front end surface of the insulating cover 62. Further back from the front end of the insulating cover 62, the sheath 64 is peeled out and the shield layer 63 is exposed. The exposed portion of the shield layer 63 encloses the outer circumferential surface of the insulating cover 62. The front end of the exposed portion of the shield layer 63 is located at a position slightly back from the front end of the insulating cover 62. The shield layer 63 is made of a braided wire, metal foil, or the like and has flexibility and plasticity.

Next, the process of assembling the shielded terminal 10 and the process of connecting the shielded terminal 10 and the shielded electrical wire 60 will be described. First, the back end portion of the inner conductor 11 is bonded to the front end portion of the core wire 61 of the shielded electrical wire 60. The back end portion of the inner conductor 11 and the front end portion of the shielded electrical wire 60 are arranged in a line with the axis orientated with the front-and-back direction. Next, with the first shell 21 in a state with the shape illustrated in FIG. 7, the dielectric 12 is housed inside the cylindrical portion 23 and the arc portion 24 from below the first shell 21. Next, with the cover portion 13 opened, the front end portion of the inner conductor 11 is housed inside the dielectric 12. After the inner conductor 11 is housed, the cover portion 13 is closed.

The connection portion of the inner conductor 11 and the core wire 61 is housed inside the back end portion of the dielectric 12, the front end surface of the insulating cover 62 and the back end surface of the dielectric 12 are brought close together into a positional relationship in which they face one another in the front-and-back direction or a state in which they are in contact in the front-and-back direction. The back end portion of the dielectric 12 projects backward from the opening on the back surface side of the arc portion 24. The upper surface of the back end portion of the dielectric 12 is covered by the extending portion 25, and the upper surface portion of the shield layer 63 is covered by the upper surface electrical wire connection portion 30. The back end of the upper surface electrical wire connection portion 30 is located at a position further forward than the front end of the sheath 64.

Thereafter, the substrate portion 27 is rotated 90° up and back with the bend portion 29 as the fulcrum, overlapping the substrate portion 27 with the back end portion lower surface of the dielectric 12. Via the rotation, the left and right side plate portions 28 are displaced and cover the left and right outer surface of the back end portion of the dielectric 12, and the angular enclosing portion 26 is formed by the extending portion 25, the substrate portion 27, and both of the side plate portions 28. The angular enclosing portion 26 encloses the back end portion of the dielectric 12 and the connection portion of the inner conductor 11 and the core wire 61.

Via the rotation of the substrate portion 27, the lower surface electrical wire connection portion 31 and the left and right side surface electrical wire connection portions 32 are positioned covering the lower surface portion of the shield layer 63 and the left and right side surface portions. The back end of the lower surface electrical wire connection portion 31 and the back ends of the side surface electrical wire connection portions 32 are located at positions further forward than the front end of the sheath 64. The shield layer 63 is enclosed in the up, down, left, and right directions by the four electrical wire connection portions 30, 31, and 32. The shield layer 63 is exposed to the outer circumferential surface side of the electrical wire connection portions 30, 31, and 32 through the slits 34 between the four electrical wire connection portions.

Next, the second shell 22 is assembled together with the first shell 21 and the shielded electrical wire 60 from above. Upon assembly, the shielding portion 40 is placed over the angular enclosing portion 26 from above and attached, and the compression bonding portion 44 is placed over the back end portion of the first shell 21 and the front end portion of the sheath 64 from above and attached. The shielding portion 40 covers and hides the gap between the left and right side edges of the extending portion 25 and the upper edges of the left and right side plate portions 28. In this manner, the back end portion of the dielectric 12 is shielded around the entire periphery. The wire barrel portion 45 of the compression bonding portion 44 covers the shield layer 63 and the four electrical wire connection portions 30, 31, and 32, and the insulation barrel portion 46 covers the front end portion of the sheath 64.

From this state, the wire barrel portion 45 and the insulation barrel portion 46 are crimped and decreased in diameter to compression bond the compression bonding portion 44 to the shielded electrical wire 60. In this compression bonded state, the wire barrel portion 45 presses against the four electrical wire connection portions 30, 31, and 32, displacing each one inward in the radial direction and bringing each one into close contact with the outer circumferential surface of the shield layer 63. In this manner, the shield layer 63 and the outer conductor 20 are connected in a manner that allows electricity to flow. The insulation barrel portion 46 is crimped to the outer circumferential surface of the sheath 64. In this manner, the shielded terminal 10 and the shielded electrical wire 60 are held in a state of being bonded together in a manner that allows electricity to flow.

The front end portion of the wire barrel portion 45 presses against the front end portions of the electrical wire connection portions 30, 31, and 32 stronger than it presses against other portions and strongly presses against the outer circumferential surface of the shield layer 63. The front end portions of the electrical wire connection portions 30, 31, and 32 that are strongly crimped by the wire barrel portion 45 are the portions where the through holes 35 are formed. Thus, since the electrical wire connection portions 30, 31, and 32 are strongly pressed against the outer circumferential surface of the shield layer 63, portions of the shield layer 63 deform and enter into the through holes 35. The portions of the shield layer 63 that enters inside the through holes 35 are strongly pressed against the edge-like catch portions 36 of the opening edges of the through holes 35. Thus, between the shield layer 63 and the catch portions 36, a catch is formed in the front-and-back direction and the circumferential direction. When the shield layer 63 is strongly pulled, for example, backward relative to the outer conductor 20, the portions of the shield layer 63 that have entered into the through holes 35 press against the catch portions 36, and the catch portions 36 dig into the outer circumferential surface of the shield layer 63. This catching and digging-in allows misalignment (relative displacement in the front-and-back direction and the circumferential direction) between the shield layer 63 and the electrical wire connection portions 30, 31, and 32 to be prevented. In other words, the bonding strength from the compression bonding portion 44 via the catching action of the catch portions 36 is increased, and the reliability of the function of holding the shielded terminal 10 and the shielded electrical wire 60 in a connected state is improved.

Also, as illustrated in FIGS. 2 and 6, the engagement projections 51 of the wire barrel portion 45 engage with the engagement hole 37, extend through the shield layer 63, and dig into the insulating cover 62. The engagement between the engagement projections 51 and the engagement hole 37 restricts the relative movement in the front-and-back direction between the wire barrel portion 45 and the lower surface electrical wire connection portion 31. The engagement projections 51 digging into the insulating cover 62 restrict the relative movement in the front-and-back direction (axis direction) and the left-and-right direction (circumferential direction) between the outer conductor 20 and the shielded electrical wire 60. In this manner, the outer conductor 20 and the shielded electrical wire 60 are reliably bonded together.

The connection structure of the shielded conductive path according to the present first embodiment includes the shielded electrical wire 60 including the shield layer 63 and the shielded terminal 10 including the outer conductor 20 connected to the shield layer 63. The outer conductor 20 is formed by assembling the first shell 21 and the second shell 22. The first shell 21 includes the electrical wire connection portions 30, 31, and 32 that come into contact with the outer circumference of the shield layer 63. The second shell 22 includes the compression bonding portion 44 that is crimped to the outer circumference of the electrical wire connection portions 30, 31, and 32. The catch portions 36 that catch on the outer circumferential surface of the shield layer 63 are formed on the electrical wire connection portions 30, 31, and 32. By the catch portions 36 catching on the outer circumferential surface of the shield layer 63, relative movement between the shielded electrical wire 60 and the outer conductor 20 is prevented. This can improve the reliability of the bonding performance from compression bonding.

The catch portions 36 are opening edges of the through holes 35 that extend through from the outer circumferential surface to the inner circumferential surface of the electrical wire connection portions 30, 31, and 32. The outer circumferential portion of the shield layer 63 enters into the through holes 35, and the shield layer 63 catches on the catch portions 36 of the opening edges of the through holes 35. Also, in the process of forming the catch portions 36, cut and raising and other similar bending processing is unnecessary. Thus, manufacturing costs can be reduced.

Also, in a case where electrical wire connection portions are a single tube-like portion continuous in the circumferential direction, the amount of deformation in the radial direction of the electrical wire connection portions is insufficient and the amount of deformation at each portion around the circumferential direction is uneven. Thus, the catch portions cannot be strongly pressed against the outer circumferential surface of the shield layer 63. As a countermeasure, the plurality of electrical wire connection portions 30, 31, and 32 are disposed at intervals in the circumferential direction. According to this configuration, each one of the electrical wire connection portions 30, 31, and 32 can be displaced in the radial direction independently of the other electrical wire connection portions 30, 31, and 32. In other words, the presence of the other electrical wire connection portions 30, 31, 32 does not restrict the displacement amount in the radial direction of each one of the electrical wire connection portions 30, 31, and 32. Accordingly, the catch portions 36 of the electrical wire connection portions 30, 31, and 32 are strongly pressed against the outer circumferential surface of the shield layer 63, allowing them to deeply catch in the shield layer 63.

The compression bonding portion 44 includes the front side crimping portions 48 extending in the circumferential direction from substrate portion 27 while supported on only one side, and the engagement projections 51 that engage with the engagement hole 37 of the lower surface electrical wire connection portion 31 are formed in the extending end portions of the front side crimping portions 48. According to this configuration, relative movement between the first shell 21 and the second shell 22 can be prevented by the locking action of the engagement projections 51 of the front side crimping portions 48 and the engagement hole 37 of the lower surface electrical wire connection portion 31. Relative movement between the compression bonding portion 44 and the shield layer 63 can be prevented due to the engagement projections 51 digging into the shield layer 63.

The compression bonding portion 44 includes the front side crimping portions 48 extending in the circumferential direction from substrate portion 27 while supported on only one side, and the compression bonding portion 44 is crimped at the front end portions of the outer circumferential edges of the front side crimping portions 48 to give the maximum amount of deformation. The catch portions 36 are disposed in the regions that are pressed by the front end portions of the front side crimping portions 48, or in other words at the front end portions of the electrical wire connection portions 30, 31, and 32. According to this configuration, the catch portions 36 can effectively catch in the shield layer 63.

Other Embodiments

The catch portion may be formed via a cut and raise method, a hammering method, or the like.

The electrical wire connection portion may be a single tube-shaped portion that is continuous in the circumferential direction with no break.

The electrical wire connection portion may not include an engagement hole.

A configuration may be used in which an engagement projection portion does not dig into a shield layer.

The catch portions may be disposed in regions corresponding the back edge portion and the side edge portion of the front side crimping portions, or may be disposed in regions distanced from the outer circumferential edge portions of the front side crimping portions, in other words regions corresponding to the central portion of the front side crimping portions.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connection structure comprising:

a shielded electrical wire including a shield layer; and a shielded terminal including an outer conductor configured to be connected to the shield layer, wherein the outer conductor is formed by assembling a first shell including at least one electrical wire connection portion that extends rearward in an axial direction of the shielded electrical wire and is configured to come into contact with an outer circumference of the shield layer, each of the at least one electrical wire connection portion supported at one end by a forward portion of the first shell, and a second shell including a compression bonding portion that is configured to be crimped to an outer circumference of the at least one electrical wire connection portion, and a catch portion including an opening edge of a through hole is formed in at least one of the at least one electrical wire connection portion, the opening edge formed on an inner circumferential surface of the at least one electrical wire connection portion and configured to catch on an outer circumferential surface of the shield layer when the compression bonding portion is crimped.

2. The connection structure according to claim 1, wherein the through hole extends from an outer circumferential surface of the at least one electrical wire connection portion to the inner circumferential surface of the at least one electrical wire connection portion and is formed by a pressing process with respect to each of the at least one electrical wire connection portion, and the pressing process produces a right angle edge on the inner circumferential surface of the at least one electrical wire connection portion.

3. The connection structure according to claim 1, wherein the at least one electrical wire connection portion includes a plurality of electrical wire connection portions disposed at intervals in a circumferential direction of the shielded electrical wire.

4. The connection structure according to claim 1, wherein the compression bonding portion includes a crimping portion that extends in a circumferential direction from a base portion while supported on only one side, and an engagement projection that engages with an engagement hole of the electrical wire connection portion is formed on an extending end portion of the crimping portion.

5. The connection structure according to claim 4, wherein the engagement projection digs into the shield layer.

6. The connection structure according to claim 4, wherein the shield layer covers an outer circumferential surface of an insulating cover of the shielded electrical wire, and the engagement projections are configured to be extended through the shield layer so as to dig into the insulating cover when engaged with the engagement hole.

7. The connection structure according to claim 4, wherein the engagement hole is disposed further back than the through hole.

8. The connection structure according to claim 4, wherein an opening area of the engagement hole is greater than an opening area of through hole.

9. The connection structure according to claim 1, wherein the compression bonding portion includes a crimping portion that extends in a circumferential direction from a base portion while supported on only one side, the compression bonding portion is crimped at an outer circumferential edge portion of the crimping portion to give a maximum amount of deformation, and the catch portion is disposed in a region pressed by an outer circumferential edge portion of the crimping portion.

* * * * *